US010042039B2

(12) United States Patent
Melamed

(10) Patent No.: US 10,042,039 B2
(45) Date of Patent: Aug. 7, 2018

(54) DEVICE SYSTEM AND METHOD FOR DYNAMIC SIGNAL MEASUREMENT RANGE SCALING

(71) Applicant: VAYYAR IMAGING LTD, Yehud (IL)

(72) Inventor: Raviv Melamed, Nes Ziona (IL)

(73) Assignee: VAYYAR IMAGING LTD, Yehud (IL)

( * ) Notice: Subject to any disclaimer, the term of this patent is extended or adjusted under 35 U.S.C. 154(b) by 525 days.

(21) Appl. No.: 14/677,244

(22) Filed: Apr. 2, 2015

(65) Prior Publication Data

US 2015/0285900 A1 Oct. 8, 2015

Related U.S. Application Data

(60) Provisional application No. 61/973,875, filed on Apr. 2, 2014.

(51) Int. Cl.

*G01S 7/285* (2006.01)
*G01S 7/282* (2006.01)
*G01S 13/00* (2006.01)
*G01S 7/40* (2006.01)

(52) U.S. Cl.

CPC .............. *G01S 7/285* (2013.01); *G01S 7/282* (2013.01); *G01S 2007/4013* (2013.01)

(58) Field of Classification Search

CPC ... G01S 7/02; G01S 7/28; G01S 7/282; G01S 7/285; G01S 7/40; G01S 7/4004; G01S 7/4008; G01S 2007/4013; G01S 7/2813; H04B 1/06; H04B 1/10; H04B 1/12; H04B 1/126; H04W 52/04; H04W 52/18; H04W 52/20; H04W 64/00

See application file for complete search history.

(56) References Cited

U.S. PATENT DOCUMENTS 4,143,372 A * 3/1979 Salvaudon et al. ... G01S 7/2813
4,177,464 A * 12/1979 Masak .................. G01S 7/2813 250/338.1
5,117,505 A * 5/1992 Talwar ................... H04B 1/126 343/853
5,644,316 A * 7/1997 Lewis et al. ............ G01S 7/282
5,669,066 A * 9/1997 Borg ..................... H04W 52/20 455/132
6,473,619 B1 * 10/2002 Kong .................... H04W 64/00 340/988
2014/0159955 A1 * 6/2014 Schuman ............. G01S 7/2813

* cited by examiner

*Primary Examiner* — Bernarr E Gregory
(74) *Attorney, Agent, or Firm* — Browdy and Neimark, PLLC

(57) ABSTRACT

A measurement device is disclosed, having a receiver/transmitter with extended instantaneous dynamic range. The receiver/transmitter includes at least one input port, which is configured to receive signals; a primary receiver/transmitter coupled to the input/output port via a primary path; and a plurality of auxiliary receivers/transmitters. The plurality of auxiliary receivers/transmitters are coupled to the input/output port via secondary paths. The attenuation of each of the secondary paths is higher than the attenuation of the primary path.

18 Claims, 4 Drawing Sheets

DEVICE SYSTEM AND METHOD FOR DYNAMIC SIGNAL MEASUREMENT RANGE SCALING

FIELD OF THE INVENTION

The present invention relates to a measurement device, system and method, and more specifically, but not exclusively, to a microwave sensing system.

BACKGROUND INFORMATION

A typical measurement system including, for example, a plurality of receivers or/and transmitters is limited by its ability to sense or measure a dynamic range of received or transmitted signals. As illustrated in FIG. 1, a measurement system 100 according to the prior art, comprising a single receive port 101 connected to an attenuator 102 and an amplifier 104 is configured to measure the properties of received signals 108, such as power, spectral content, etc. The instantaneous dynamic range of the receiver may be inadequate for the intended range of target signals, spanning, for example, from low power communication signals to high power radar pulses. A typical solution to this is to put a variable attenuation in front of the receiver, and to select the attenuation according to the received signal strength.

However, in a scenario where several high power signals are transmitted towards the measurement system 100, it will not be able to measure all the transmitted signals in real time, in particular those which are not in its "capability range" due to the system fixed "attenuation" limitation. This limitation relates also to a transmitting device and system where each output/input port has a limited transmitting range.

It is an object of the present invention to provide a measurement system, such as a microwave imaging or radar system, that overcomes the problems of the prior art measurement systems.

It is another object of the present invention to provide a measurement system and method configured to receive or transmit a dynamically range of signals.

It is further another object of the present invention to provide a method and device configured to attenuate the output of the device transmitter in order to reduce the noise floor at the transmitter output.

It is an advantage of the present invention that one or more receiver/transmitter may simultaneously receive/transmit an enhanced dynamic range of signals.

According to the present system, a measurement system may be or may include a sensor system, such as a microwave sensing system or a radar system.

According to an aspect of some embodiments of the present invention, there is provided a receiver with extended instantaneous dynamic range, said receiver comprising: at least one input port, said input port being configured to receive signals; a primary receiver coupled to said input port via a primary path; and a plurality of auxiliary receivers, wherein said plurality of auxiliary receivers are coupled to said input port via secondary paths, and wherein the attenuation of each of said secondary paths is higher than the attenuation of said primary path.

In an embodiment, the signals are of dynamic range higher than can be accommodated by either the primary receiver or auxiliary receivers.

In an embodiment, the difference in the attenuation of said primary path and the secondary path with lowest attenuation is in the range of 6 to 20 dB.

In an embodiment, the plurality of auxiliary receivers are coupled to the primary port by a plurality of directional couplers.

In an embodiment, the primary receiver is coupled to the at least one input port via a directional coupler through line.

In an embodiment, the plurality of auxiliary receivers are coupled to the input port via a power splitter for splitting said signals.

In an embodiment, the power splitter is an asymmetric power splitter.

In an embodiment, the primary path is a low-attenuation path.

In an embodiment, the outputs of the primary receiver and outputs of the auxiliary receivers are further combined to obtain a single output.

In an embodiment, the combining is performed digitally on digitized outputs of the primary receiver and auxiliary receivers.

In an embodiment, the combining is a weighted sum of the primary receiver and auxiliary receivers' outputs.

In an embodiment, the weights of the weighted sum are related to the signals strength.

According to a second aspect of some embodiments of the present invention, there is provided a transmitter with extended instantaneous dynamic range, said transmitter comprising: at least one output port, said output port being configured to transmit signals; a primary transmitter coupled to said port via a primary path; and a plurality of auxiliary transmitters, wherein said plurality of auxiliary transmitters are coupled to said output port via a secondary path, and wherein the attenuation of each of said secondary paths is higher than the attenuation of said primary path.

In an embodiment, the signals are of dynamic range higher than can be accommodated by either the primary transmitter or auxiliary transmitters.

In an embodiment, the difference in the attenuation of said primary path and the secondary path with lowest attenuation is in the range of 6 to 20 dB.

In an embodiment, the plurality of auxiliary transmitters are coupled to said primary port by a plurality of directional couplers.

In an embodiment, the primary transmitter is coupled to said at least one output port via a directional coupler through line.

In an embodiment, the plurality of auxiliary transmitters are coupled to said port via a power splitter for splitting said plurality of signals.

In an embodiment, the power splitter is an asymmetric power splitter.

According to a third aspect of some embodiments of the present invention, there is provided a method for increasing the dynamic power sensing range of a sensing device, said sensing device comprising a plurality of auxiliary transmitters or receivers and at least one port coupled to a primary transmitter or receiver, said method comprising: coupling said plurality of auxiliary transmitters or receivers to said primary transmitter or receiver; and attenuating said auxiliary transmitters' or receivers' power.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION

The present invention relates to a measurement device, system and method, more specifically but not exclusively, to a microwave sensing system. One of the major limitations in the field of measurement systems and devices is the ability to receive and transmit a wide and dynamic range of input and output signals, for example to test the resistance of the measurement system amplifiers, transmitters and receivers to distortions caused by high powered signals or to examine the measurement sensitivity to very low powered signals. This wide dynamic range requirement creates a challenge to provide a system and method that is configured to receive and transmit, both, a "restrained" and liner signal through all the transmission or received chain.

Figure 1:
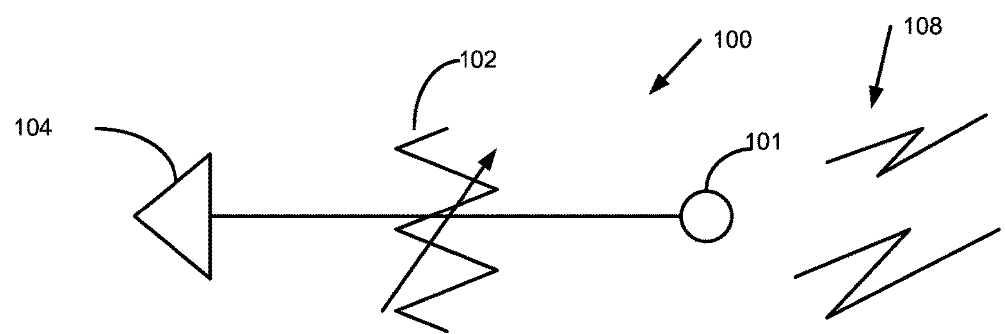
FIG. 1 is a schematic view of a measurement system according to an embodiment of the prior art.

Dynamic range maximization schemes solutions as provided by the prior art switch between serial attenuators or other means of automatic gain controls. However the prior art schemes (as shown in FIG. 1), at any given point in time, are limited by the associated receiver's dynamic range. The change of input gain acts only to shift the level about which a constant instantaneous dynamic range is set.

The present invention system scheme, in contrast, increases the instantaneous dynamic range as given by examining the output of all receivers. Briefly summarized, according to one aspect of the present invention, there is provided a measurement device with enhanced dynamic range, the device comprising a receiver and/or transmitter with extended instantaneous dynamic range, the receiver/transmitter comprising: at least one input port, said input port being configured to receive signals; a primary receiver/transmitter coupled to said input/output port via a primary path; and a plurality of auxiliary receivers/transmitters wherein said plurality of auxiliary receivers/transmitters are coupled to said input/output port via secondary paths, wherein the attenuation of each of said secondary paths is higher than the attenuation of said primary path. The signals are of dynamic range higher than can be accommodated by a single receiver/transmitter, e.g., either the primary receiver or the auxiliary receivers.

According to a second aspect of the invention, there is provided a method for measuring, for example simultaneously, a signal such as an input signal at one or more receivers which differ in the degree of attenuation they present towards the input signal.

Receiver with Enhanced Dynamic Range

Figure 2A:
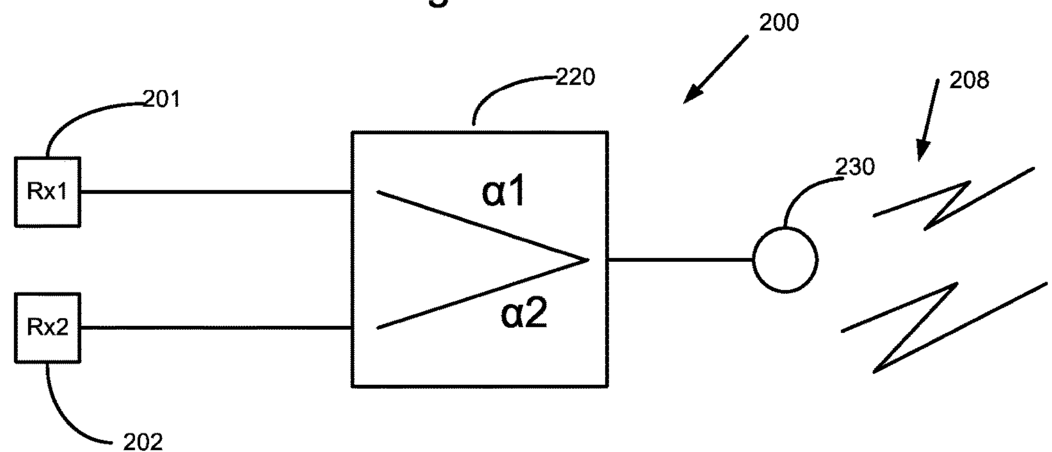
FIGS. 2A-2B show a simplified block diagram of two measurement devices according to some embodiments of the invention.

Reference is now made to FIG. 2A, illustrating a receiver 200 with enhanced dynamic range according to one embodiment of invention. The measurement device 200 may include at least two receivers such as Rx1 (201) and Rx2 (202) connected or coupled to a power splitter 220 such as an asymmetric power splitter for splitting a signal 208 received at port 230.

Figure 2B:
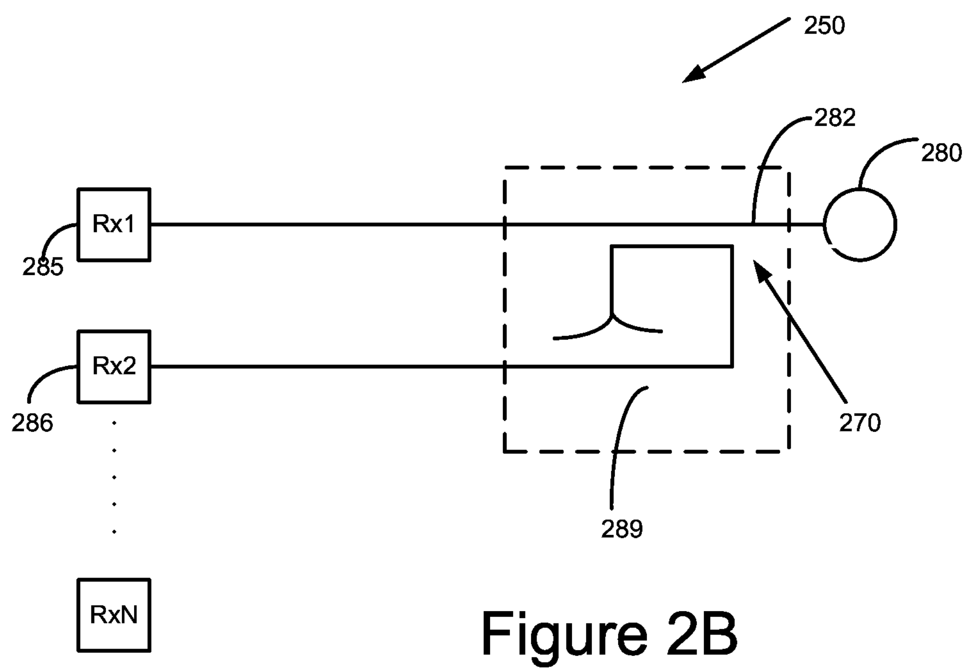

According to another embodiment, as illustrated in FIG. 2B, a dynamic measurement device 250 may include a primary receiver 285 which is connected or coupled to an external input port 280 through a low attenuation path 282, such as a through line of a directional coupler, and a plurality of auxiliary receivers Rx2-Rxn 286 which are connected or coupled to the same external port 280 via an attenuated path 289, such as a coupled arm of a directional coupler 270 or other means for splitting or attenuating a signal, such as an input signal received at port 280 and further at Rx2-RxN. For example, the device 250 is configured to simultaneously receive an unattenuated signal as well as a coupled signal attenuated by, say, 15 dB.

Figure 3:
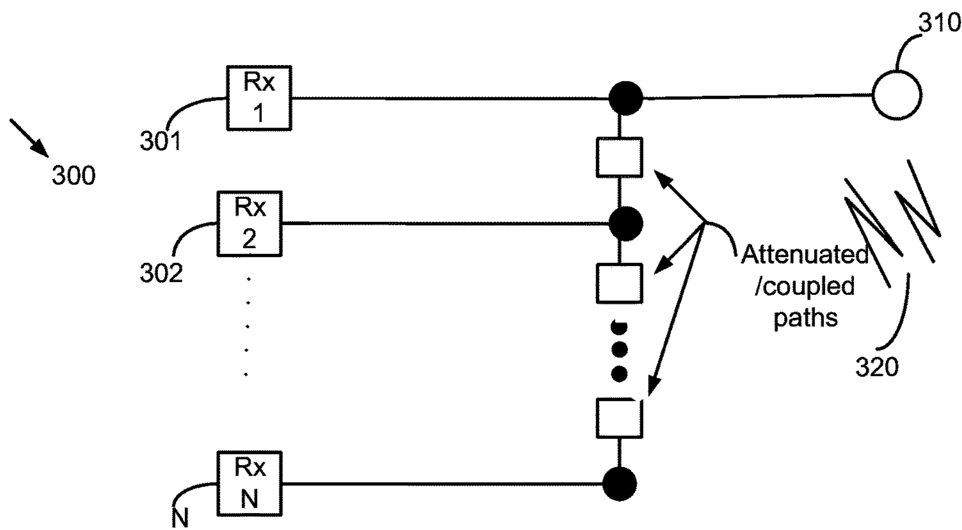
FIG. 3 shows a simplified block diagram of a measurement system including a plurality of receivers, according to an embodiment of the invention.

Reference is now made to FIG. 3, which is a simplified illustration of a device scheme of a measurement device 300 including a plurality of receivers Rx1-RxN (301, 302 . . . N), configured to receive and measure, for example simultaneously, one or more signals received at port 310. According to one embodiment of the invention one or more receivers, such as receivers 302, 303-N, may be coupled to one or more receivers, such as receiver 301. The coupled receivers 302, 303-N differ in the degree of attenuation they present towards an input signal 320, therefore maximizing the system 300 operational dynamic range and input power.

In other words, instead of providing a plurality of transmit/receive modules and configuring the dynamic range of each transmit/receive module as suggested by the prior art (shown in FIG. 1), the present invention provides a method and device for dynamically maximizing the dynamic range and input power of a measurement device by, for example, coupling a number of transmit or/and receive modules to a single port. For example, in a set of receivers (e.g., identical receivers) of maximal operational input power −30 dBm [dBm], assuming for the sake of the example that a receiver with the maximal attenuation towards the input is 30 [dB], and a receiver with minimal attenuation has 1 [dB] as incurred by the parallel receivers configuration shown in FIG. 3. The maximal operational input power is set by the most attenuated receiver and is 0 dBm=−30 dBm+30 dB. In this example, we may use three receivers with attenuations differing from each other by 15 dB. By this, we may maintain high instantaneous dynamic range for signal levels varying from −30 dBm to 0 dBm.

This effectively results in an increase of (Amax-Amin) [dB] in dynamic range, and may be extended over many orders of magnitude.

Processing of the outputs of multiple receives allows a variety of schemes. A simplistic one would be selecting one of the receiver outputs according to the signal strength. However, an inherent characteristic of the device scheme shown in FIG. 3 is that the output of all receivers may be analyzed jointly, thus enabling more refined signal analysis schemes. For example, both outputs could be combined in a way that preserves the high instantaneous dynamic range and submits the combined signal for further processing. Such combining can be a weighted summation of the receiver outputs, with the weights being selected according to the signal strength.

Transmitter with Enhanced Dynamic Range

Figure 4A:
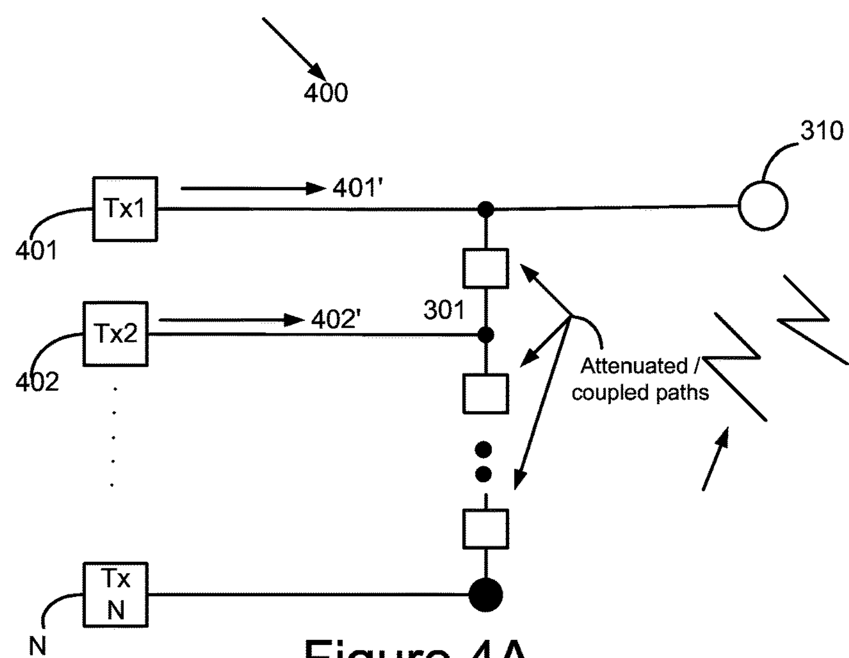
FIGS. 4A-4B show a simplified block diagram of two measurement systems including a plurality of transmitters, according to some embodiments of the invention.

According to another embodiment, as illustrated in FIG. 4A, there is provided a device such as measurement device 400 including a plurality of transmitters Tx1, Tx2-TxN (401, 402 . . . N), configured to transmit, for example simultaneously, one or more signals via port 410. For example, one or more transmitters, such as transmitters 402, 403-N, may be coupled to one or more transmitters, such as transmitter 401, for attenuating one or more transmitted signals. The coupled transmitters 402, 403-N differ in the degree of attenuation they present towards an output signal, therefore maximizing the system 400 operational dynamic range and output power.

For example, a signal 401' transmitted directly via transmitter 401 may be a high power signal, while another signal 402', transmitted via transmitter 402, may be attenuated and have a lower noise floor compared to signal 401'.

Figure 4B:
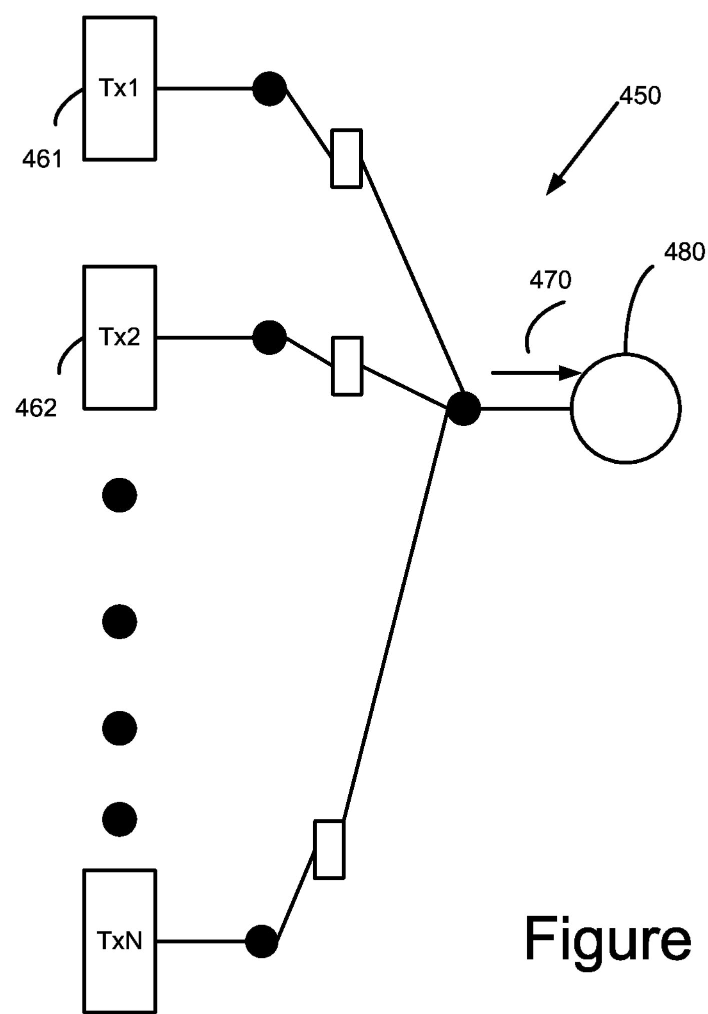

FIG. 4B illustrates another embodiment of a device 450 comprising an output port 480 connected or coupled to a plurality of transmitters Tx1, Tx2-TxN (461-N) coupled to one another and differing in the degree of attenuation they present towards an output signal 470, therefore maximizing the system 450 operational dynamic range and output power.

The terms “comprises”, “comprising”, “includes”, “including”, “having” and their conjugates mean “including but not limited to”. This term encompasses the terms “consisting of” and “consisting essentially of”.

As used herein, the singular form “a”, “an” and “the” include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system with extended instantaneous dynamic range, said system comprising:
- at least one input port, said at least one input port being configured to receive signals;
- a plurality of receivers configured to receive simultaneously said signals,
- wherein said plurality of receivers are coupled to said at least one input port via paths comprising fixed attenuation values, wherein said fixed attenuation values are different from each other;
- a primary receiver coupled to said at least one input port via a primary path to receive said signals; and
- a plurality of auxiliary receivers, wherein said plurality of auxiliary receivers are coupled to said at least one input port via secondary paths to receive said signals, and wherein attenuation of each of said secondary paths is fixed and is higher than attenuation of said primary path.

2. The system of claim 1, wherein said primary receiver and said at least one input port are configured to receive said signals having a dynamic range higher than the dynamic range of the primary receiver or auxiliary receivers.

3. The system of claim 1, wherein the difference in the attenuation of said primary path and the secondary path with lowest attenuation is in the range of 6 to 20 dB.

4. The system of claim 1, wherein said plurality of auxiliary receivers are coupled to said at least one input port by a plurality of directional couplers.

5. The system of claim 1, wherein said primary receiver is coupled to said at least one input port via a directional coupler through line.

6. The system of claim 1, wherein said plurality of auxiliary receivers are coupled to said input port via a power splitter for splitting said signals.

7. The system of claim 6, wherein said power splitter is an asymmetric power splitter.

8. The system of claim 1, wherein outputs of the primary receiver and outputs of the auxiliary receivers are further combined to obtain a single output.

9. The system of claim 8, wherein said combining is performed digitally on digitized outputs of the primary receiver and auxiliary receivers.

10. The system of claim 9, wherein said combining is a weighted sum of the outputs of the primary receiver and auxiliary receivers.

11. The system of claim 9, wherein the weights of the weighted sum are related to the signals strength.

12. A transmitter with extended instantaneous dynamic range, said transmitter comprising:

at least one output port, said at least one output port being configured to transmit signals;

a primary transmitter coupled to said at least one output port via a primary path; and a plurality of auxiliary transmitters, said plurality of auxiliary transmitters being coupled to said output port via a secondary path, wherein attenuation of each of said secondary paths is higher than attenuation of said primary path.

13. The transmitter of claim 12, wherein said at least one output port is configured to transmit said signals having a dynamic range higher than the dynamic range of the primary transmitter or auxiliary transmitters.

14. The transmitter of claim 12, wherein the difference in the attenuation of said primary path and the secondary path with lowest attenuation is in the range of 6 to 20 dB.

15. The transmitter of claim 12, wherein said plurality of auxiliary transmitters are coupled to said primary port by a plurality of directional couplers.

16. The device of claim 12, wherein said primary transmitter is coupled to said at least one output port via a directional coupler through line.

17. The device of claim 12, wherein said plurality of auxiliary transmitters are coupled to said port via a power splitter for splitting said plurality of signals.

18. The device of claim 17, wherein said power splitter is an asymmetric power splitter.

* * * * *